(12) United States Patent
Kim et al.

(10) Patent No.: US 10,393,973 B2
(45) Date of Patent: Aug. 27, 2019

(54) OPTICAL CONNECTOR

(71) Applicant: OPTICIS CO., LTD., Seongnam-si Gyeonggi-do (KR)

(72) Inventors: Hee Dae Kim, Buk-gu Gwangju (KR); Su Hyun Pyun, Seo-gu Gwangju (KR)

(73) Assignee: OPTICIS CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/069,186

(22) PCT Filed: Apr. 12, 2017

(86) PCT No.: PCT/KR2017/003955
§ 371 (c)(1),
(2) Date: Jul. 11, 2018

(87) PCT Pub. No.: WO2017/183851
PCT Pub. Date: Oct. 26, 2017

(65) Prior Publication Data
US 2019/0033127 A1 Jan. 31, 2019

(30) Foreign Application Priority Data
Apr. 19, 2016 (KR) ........................ 10-2016-0047556

(51) Int. Cl.
*G02B 6/42* (2006.01)
*G02B 6/36* (2006.01)
(Continued)

(52) U.S. Cl.
CPC ......... *G02B 6/4286* (2013.01); *G02B 6/3652* (2013.01); *G02B 6/423* (2013.01);
(Continued)

(58) Field of Classification Search
CPC .. G02B 6/3648; G02B 6/3652; G02B 6/3692; G02B 6/423; G02B 6/4286
(Continued)

(56) References Cited

U.S. PATENT DOCUMENTS 4,854,659 A * 8/1989 Hamerslag ........... G02B 6/4207
385/14
5,365,534 A * 11/1994 Janssen ................ G02B 6/4214
372/108
(Continued)

FOREIGN PATENT DOCUMENTS

JP 2007-163666 6/2007
JP 2007-298887 11/2007
(Continued)

OTHER PUBLICATIONS

International Search Report for PCT/KR2017/003955, dated Jul. 17, 2017.
(Continued)

*Primary Examiner* — Robert Tavlykaev
(74) *Attorney, Agent, or Firm* — Nixon Peabody LLP; Jeffrey L. Costellia

(57) ABSTRACT

Provided is an optical connector. The optical connector includes an OSA substrate having a base surface and first and second support surfaces formed at a first level from the base surface and separated from each other, the OSA substrate being formed integrally therewith, a light emitting device supported by the first support surface, an optical fiber supported by the second support surface on a first optical path originating from the light emitting device, an optical filter interposed between the light emitting device and the optical fiber and configured to separate the first optical path originating from the light emitting device from a second optical path originating from the optical fiber, and a light receiving device placed on the second optical path. The
(Continued)

optical connector includes one platform and thus has advantages in terms of structural simplification and miniaturization, and also enables the optical components to be automatically aligned.

20 Claims, 11 Drawing Sheets

(51) Int. Cl.
  *G01J 1/42* (2006.01)
  *G01J 1/04* (2006.01)
(52) U.S. Cl.
  CPC ......... *G02B 6/4206* (2013.01); *G02B 6/4214* (2013.01); *G01J 1/0414* (2013.01); *G01J 1/4257* (2013.01)
(58) Field of Classification Search
  USPC .......... 385/14, 88, 89, 91–93; 398/135, 139, 398/200, 201, 212, 214
  See application file for complete search history.

(56) References Cited

U.S. PATENT DOCUMENTS

| | | | | |
|---|---|---|---|---|
| 5,611,006 A * | 3/1997 | Tabuchi | ............... | G02B 6/4204 257/432 |
| 6,097,521 A * | 8/2000 | Althaus | ............... | G02B 6/4246 359/618 |
| 6,721,511 B1 * | 4/2004 | Tatsuno | ............. | G02B 6/12019 385/33 |
| 6,985,647 B2 * | 1/2006 | Takamori | ............... | G02B 6/423 385/14 |
| 7,474,826 B2 * | 1/2009 | Tallone | .................... | G02B 6/30 385/49 |
| 7,486,846 B2 * | 2/2009 | Warashina | ........... | G02B 6/4246 385/14 |
| 7,888,793 B2 | 2/2011 | Sherrer et al. | | |
| 7,991,290 B2 | 8/2011 | Tanaka et al. | | |
| 8,121,484 B2 * | 2/2012 | Kihara | ................ | H01S 5/02212 398/135 |
| 8,265,486 B2 * | 9/2012 | Lim | ....................... | H04B 10/40 385/89 |
| 2003/0231833 A1 * | 12/2003 | Lerner | ................ | G02B 6/4214 385/49 |
| 2004/0081403 A1 * | 4/2004 | Kim | ......................... | G02B 6/30 385/49 |
| 2004/0179785 A1 * | 9/2004 | Komiya | ................... | G02B 6/42 385/49 |
| 2005/0025420 A1 * | 2/2005 | Farr | ..................... | G02B 6/4209 385/33 |
| 2011/0075976 A1 * | 3/2011 | Sutherland | ........... | G02B 6/4214 385/88 |

FOREIGN PATENT DOCUMENTS

| | | |
|---|---|---|
| JP | 2009-128777 | 6/2009 |
| JP | 2012-133191 | 7/2012 |
| KR | 10-2012-0042811 | 5/2012 |
| KR | 10-1443562 | 11/2014 |
| WO | WO-2014-157895 | 10/2014 |

OTHER PUBLICATIONS

Written Opinion for PCT/KR2017/003955, dated Jul. 17, 2017.
Korean Office Action for 10-2016-0047556, dated Aug. 1, 2017.
Korean Notice of Allowance for 10-2016-0047556, dated Feb. 21, 2018.

* cited by examiner

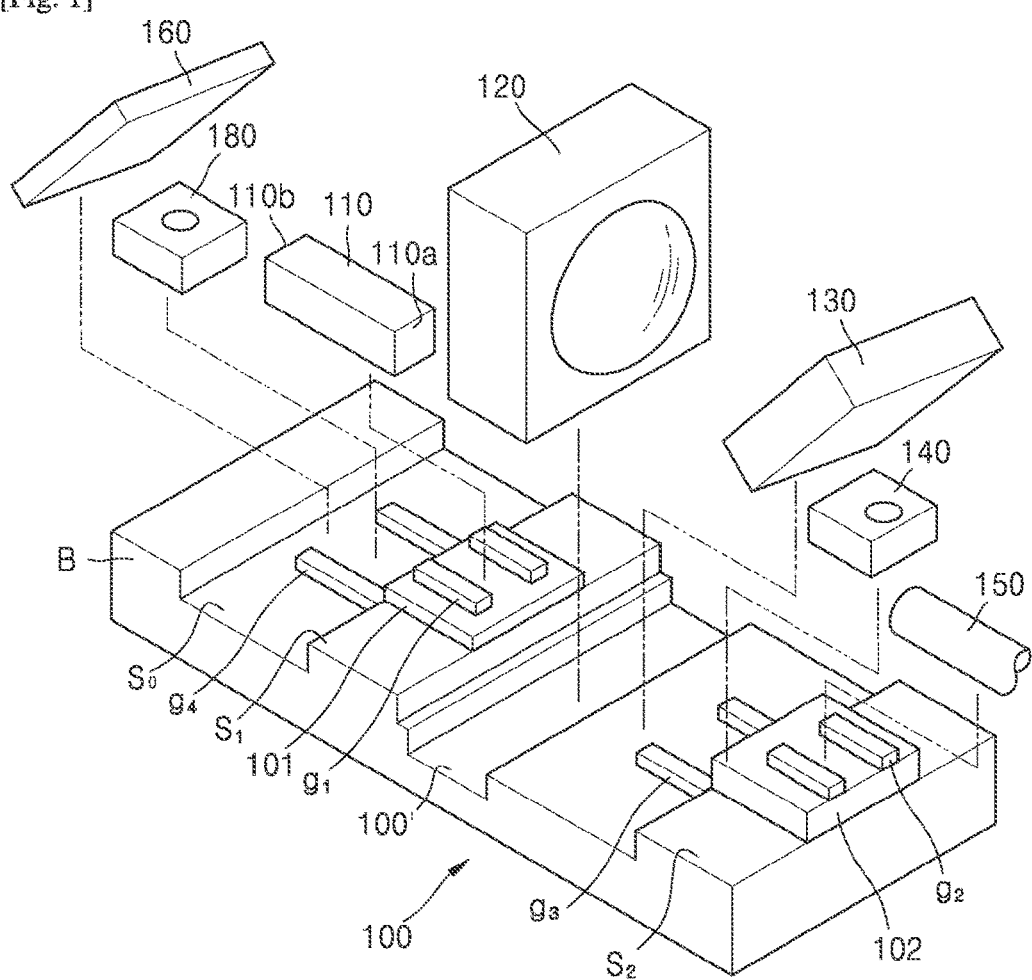

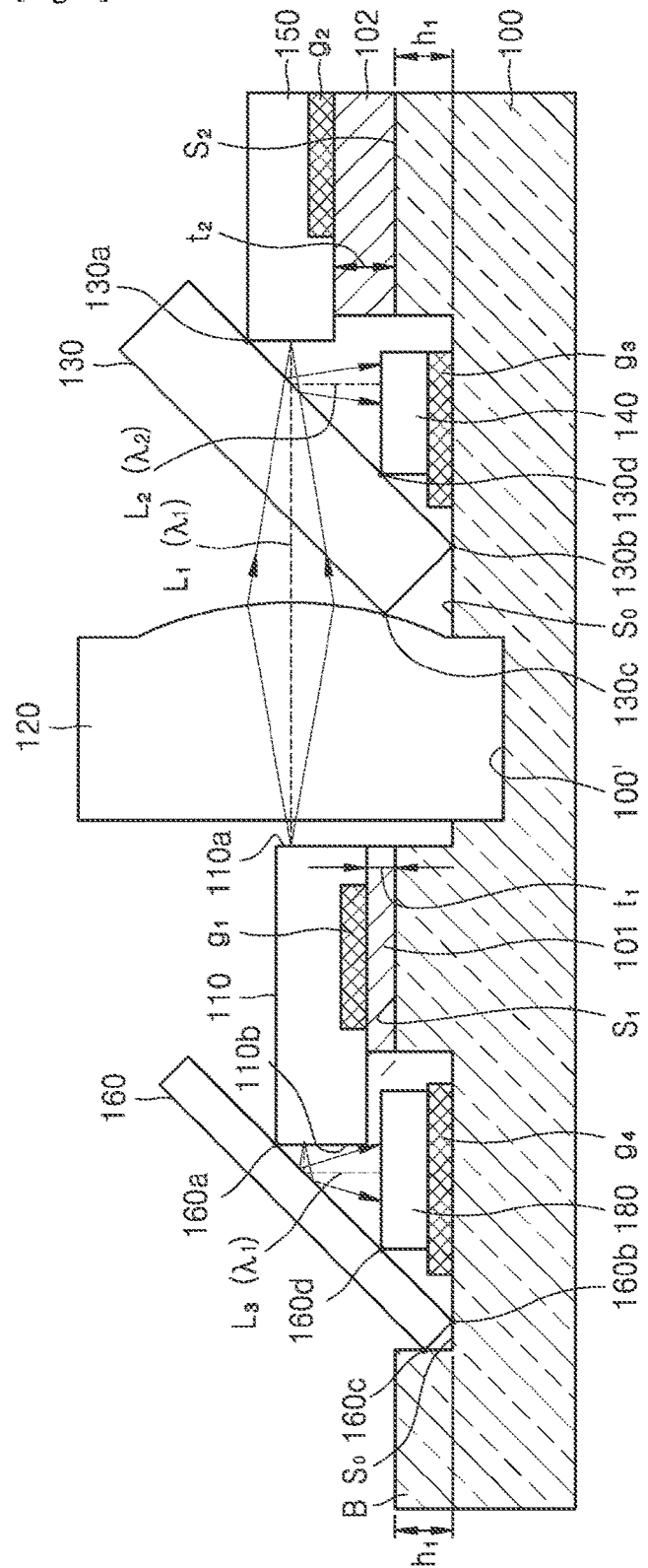
[Fig. 2]

[Fig. 3]
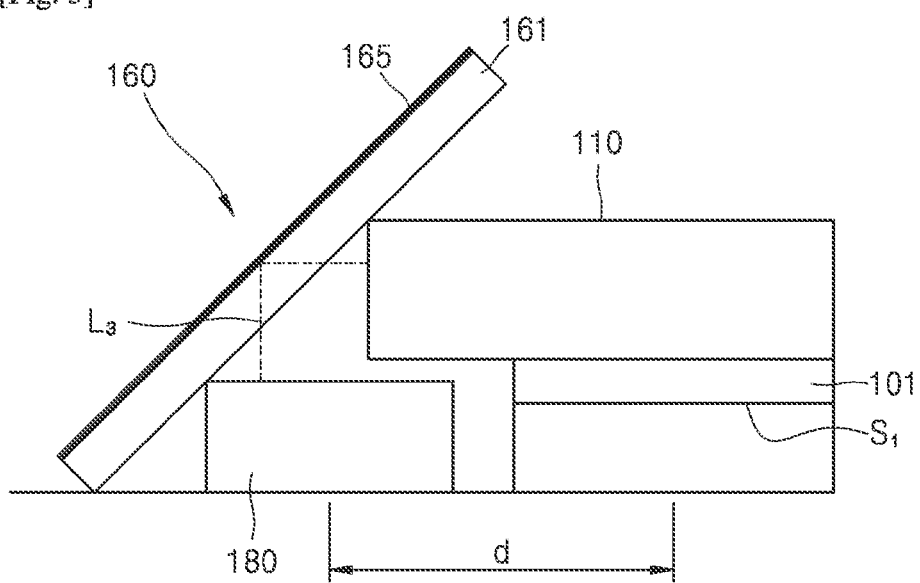

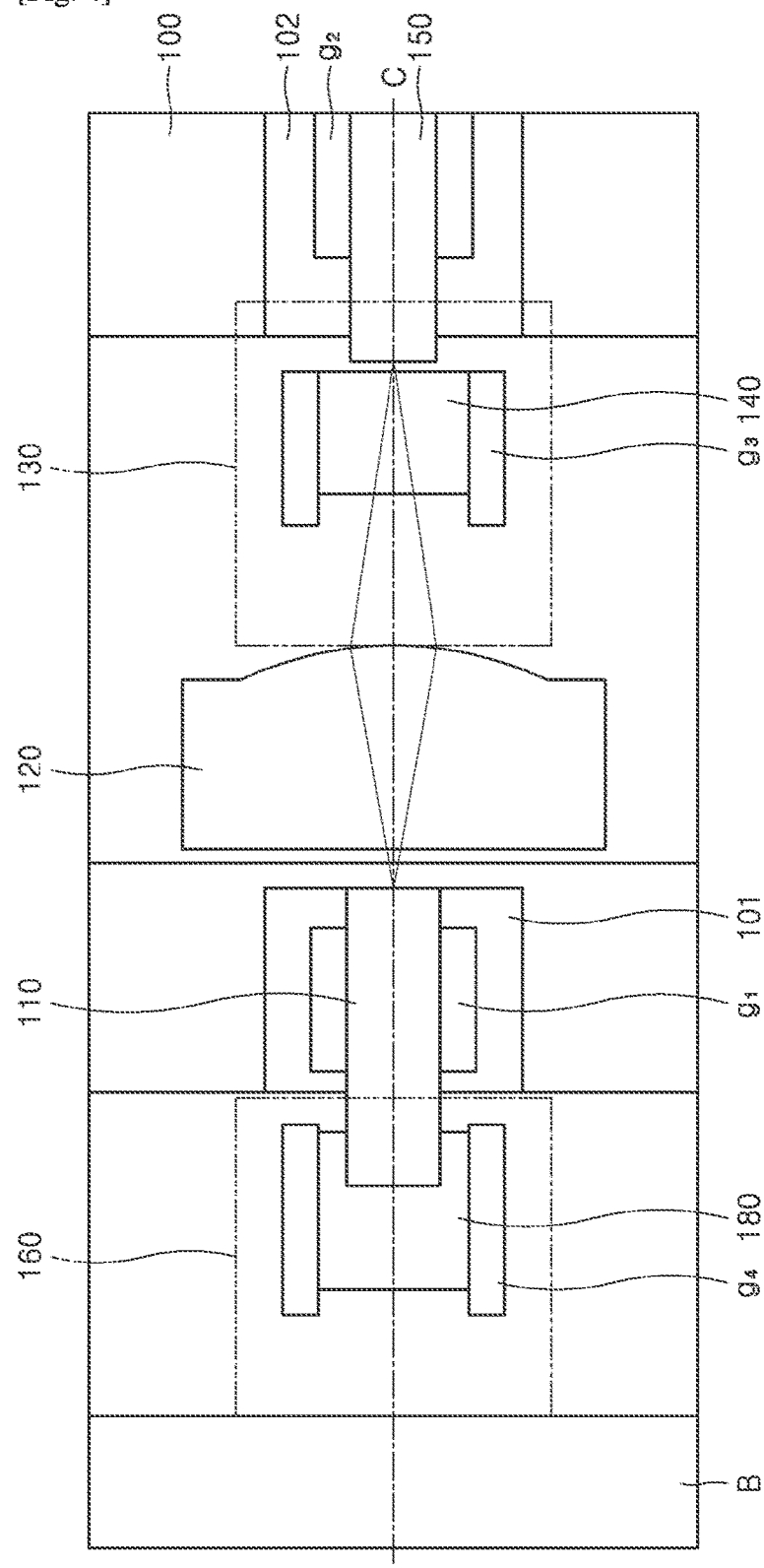
[Fig. 4]

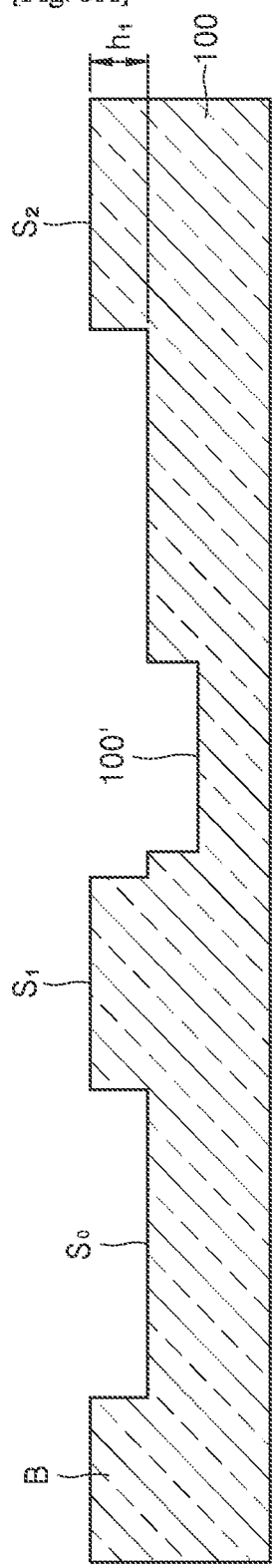

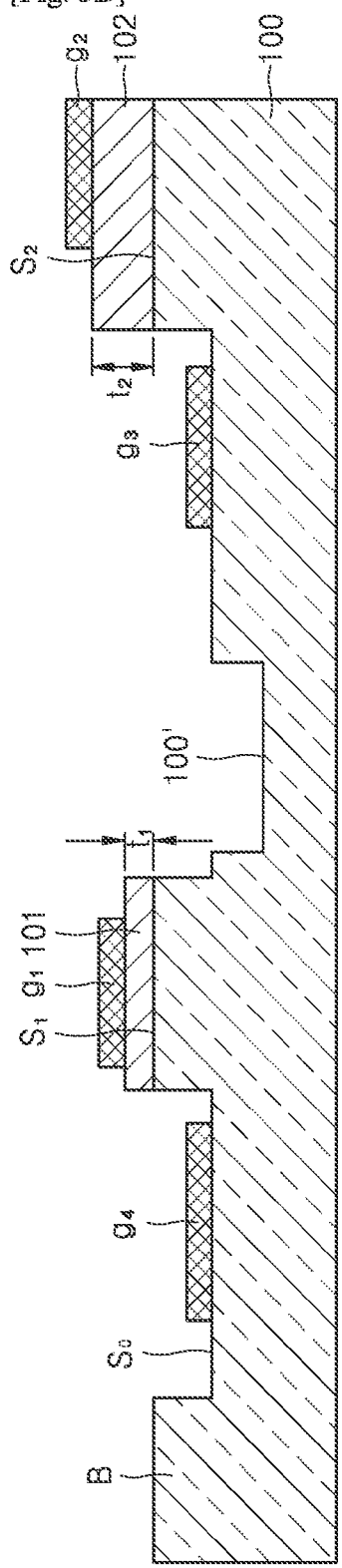
[Fig. 5B]

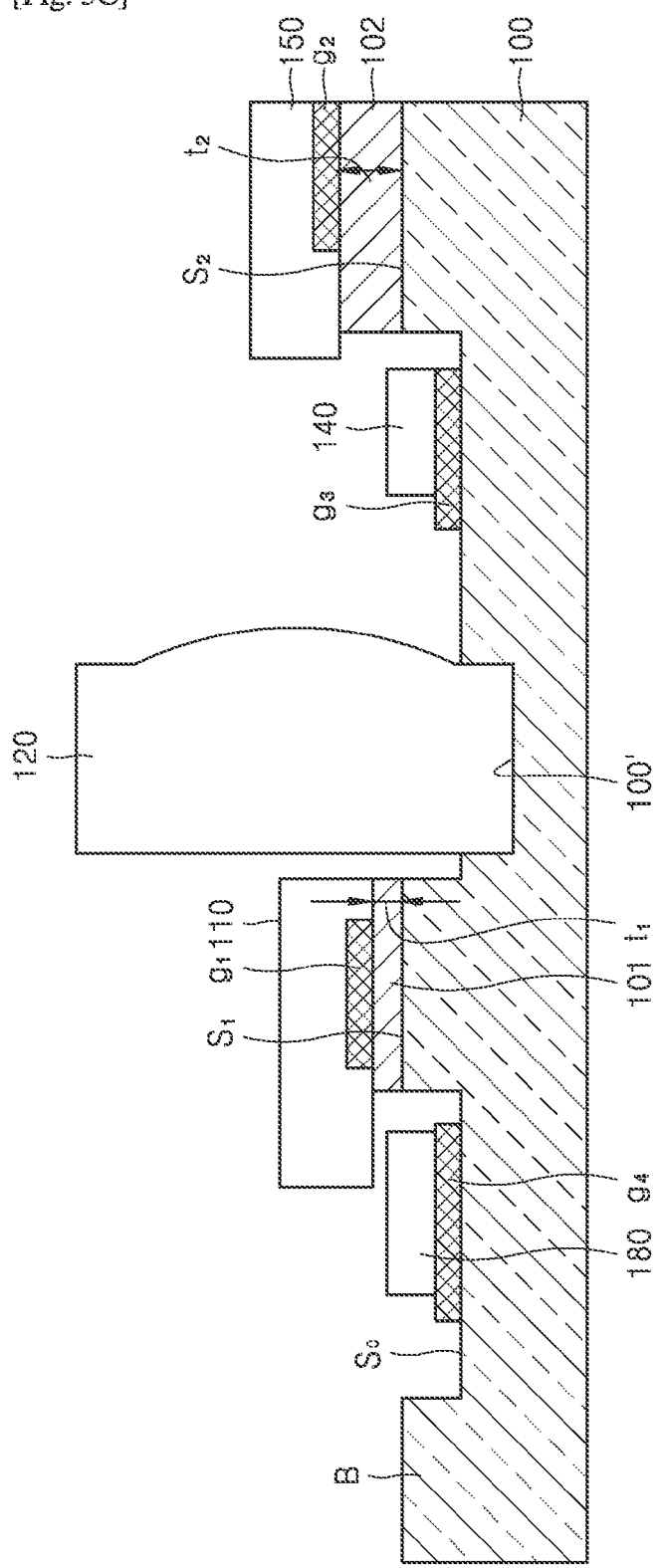
[Fig. 5C]

[Fig. 5D]
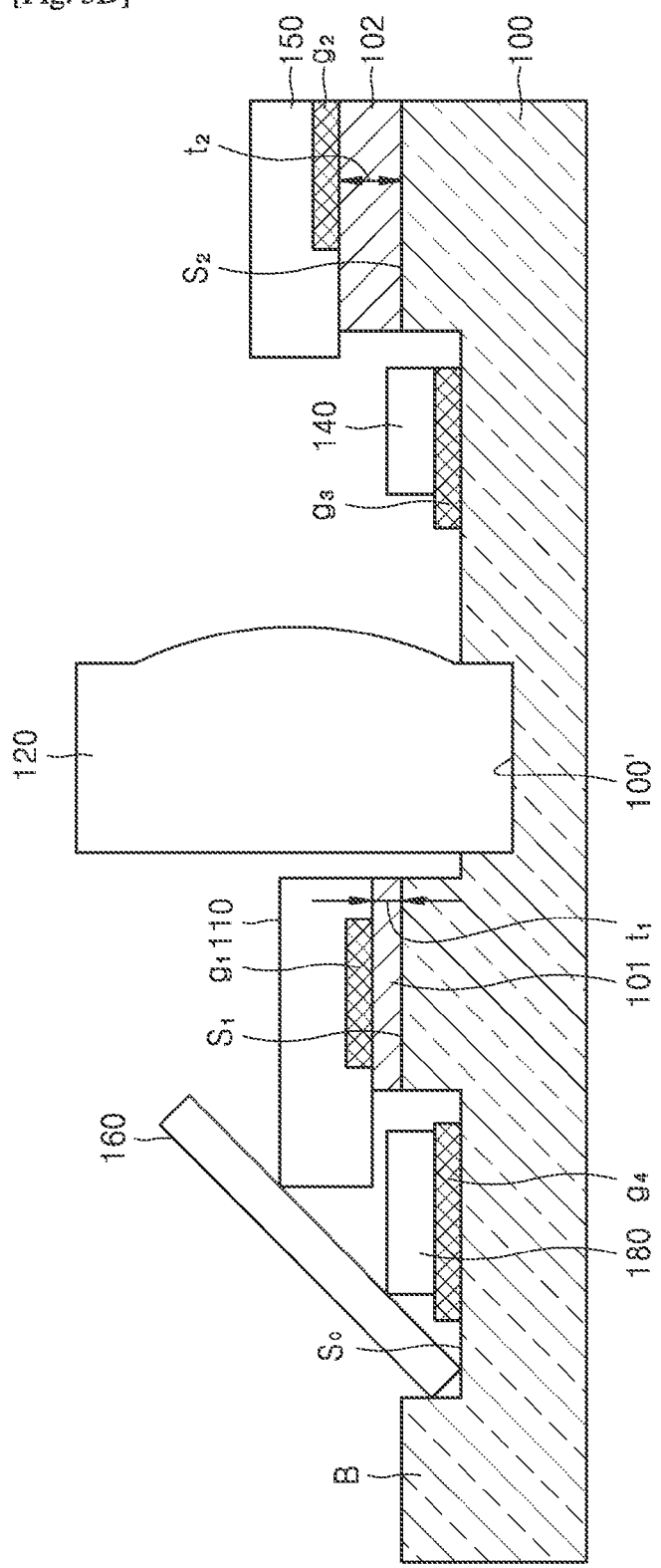

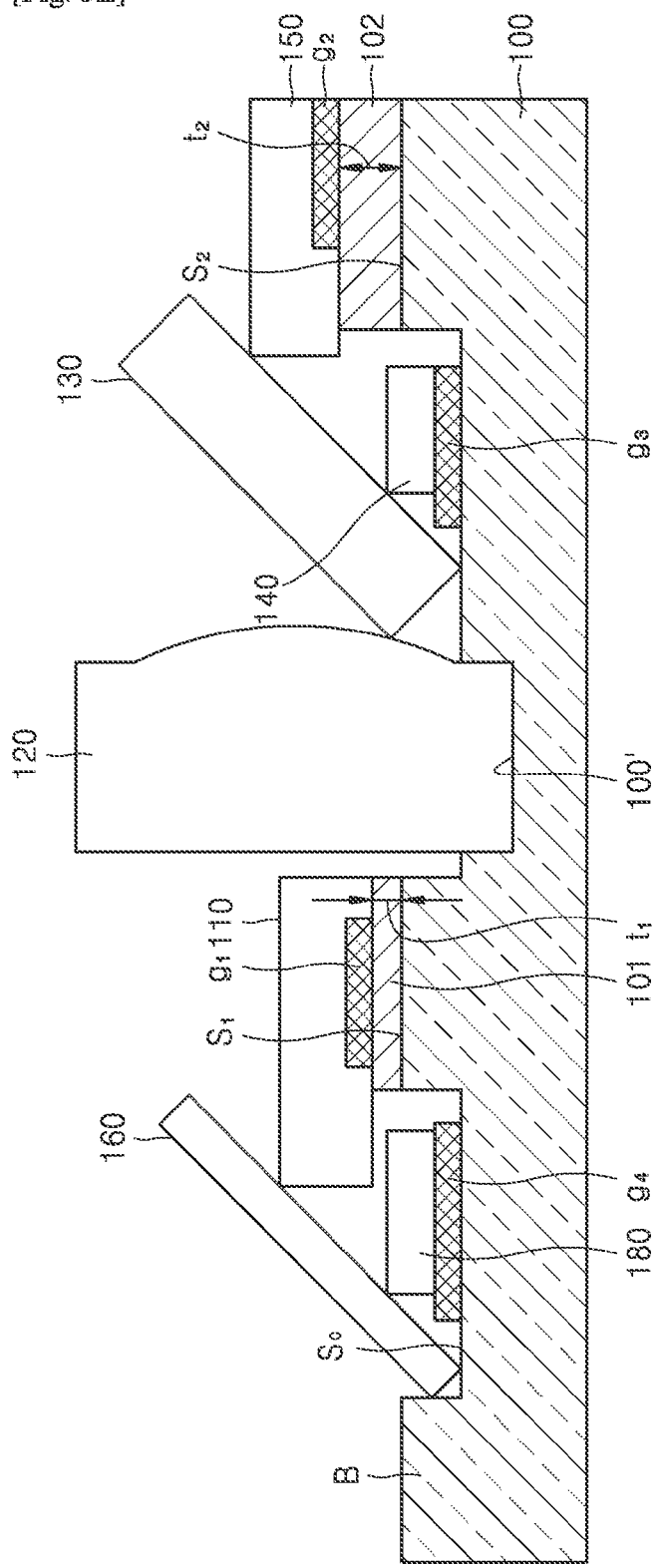
[Fig. 5E]

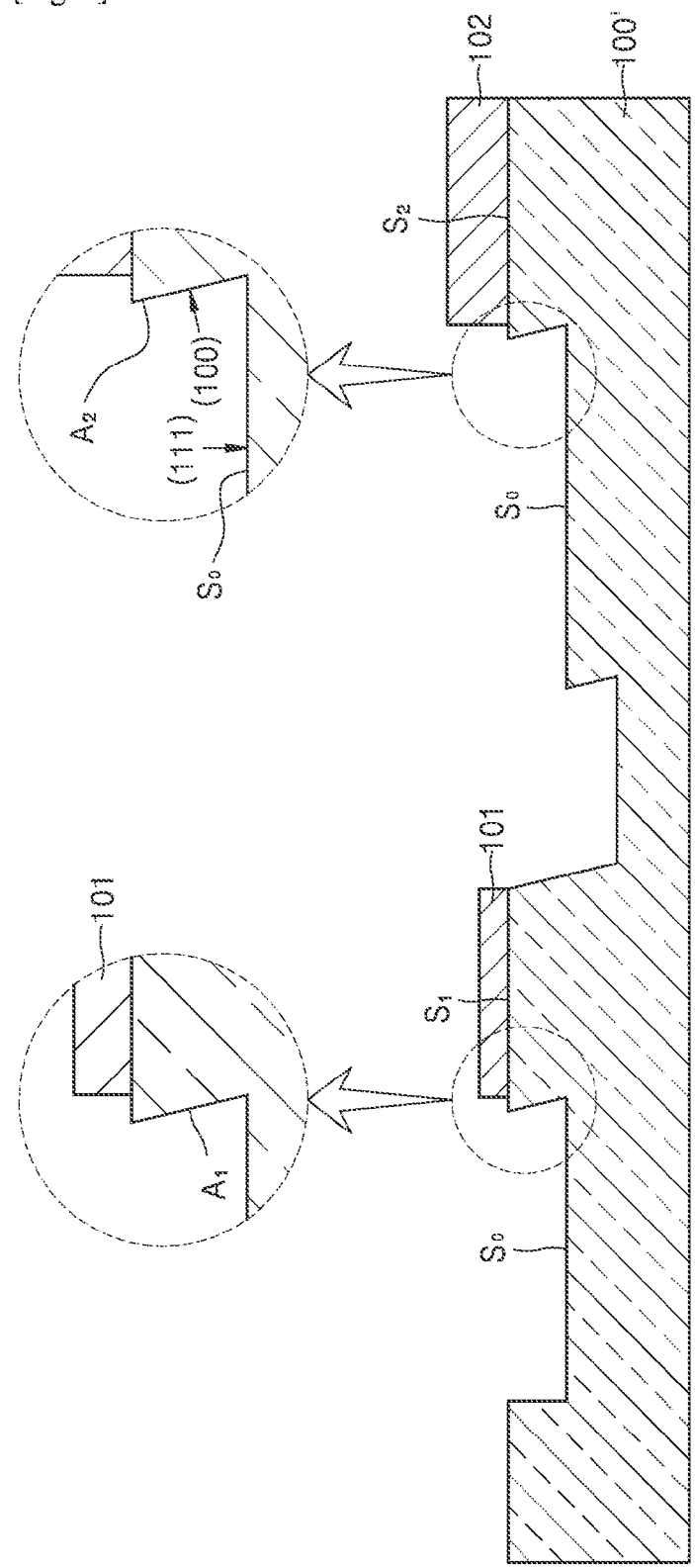
[Fig. 6]

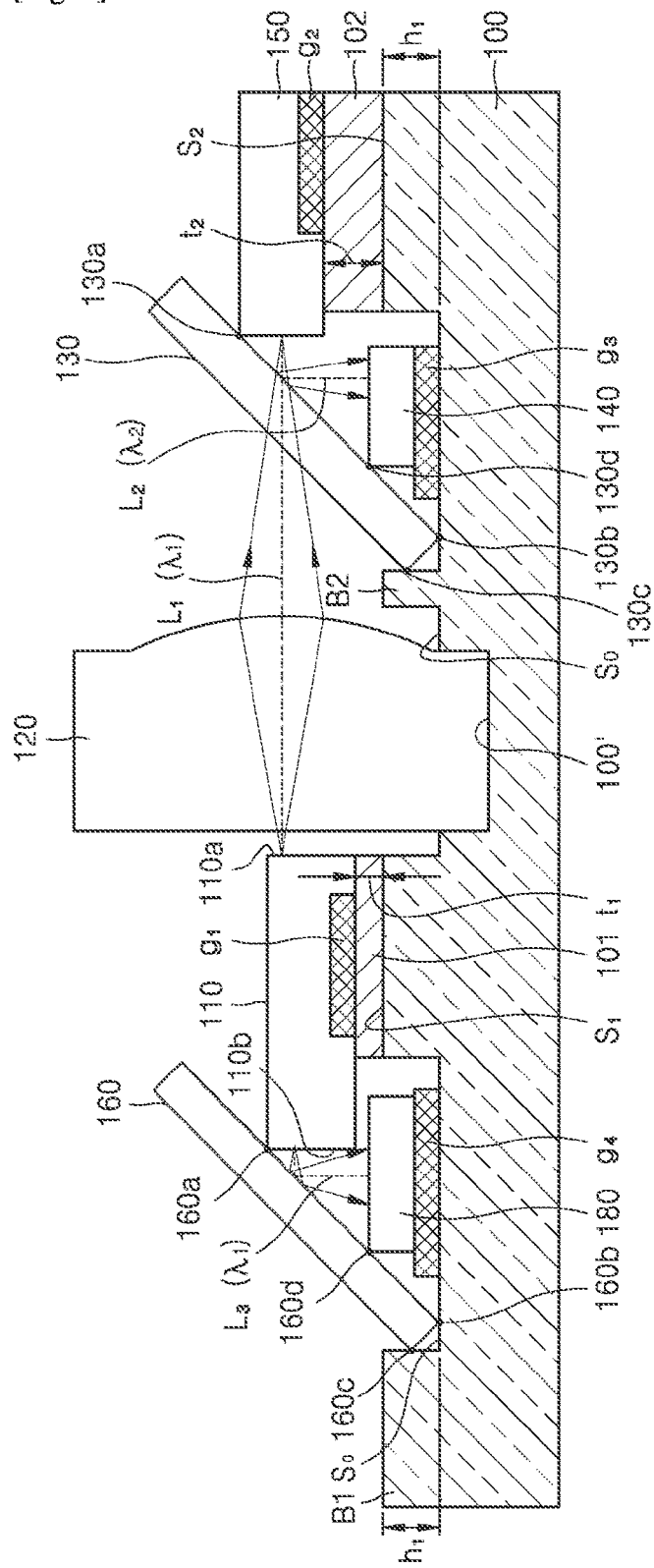
[Fig. 7]

OPTICAL CONNECTOR

TECHNICAL FIELD

The present disclosure relates to an optical connector.

BACKGROUND ART

In the related art, an optical connector including a light emitting device and optical fiber as a communication line includes two or more different platforms (Optical Sub Assembly (OSA)). In an optical connector manufactured on the basis of such separate and different platforms, misalignment is likely to occur while optical components are optically aligned or while different support bases are integrated during alignment of optical components.

In particular, optical alignment of an optical connector having multiple different platforms is not easy in two-way communication for bidirectionally performing transmission and reception through one communication line.

DESCRIPTION OF EMBODIMENTS

Technical Problem

Provided is an optical connector including one platform and having advantages in terms of structural simplification and miniaturization.

Provided is an optical connector having optical components that may be automatically aligned.

Solution to Problem

According to an aspect of the present disclosure, an optical connector includes an OSA substrate having a base surface and first and second support surfaces formed at a first level from the base surface and separated from each other, the OSA substrate being formed integrally therewith; a light emitting device supported by the first support surface; an optical fiber supported by the second support surface on a first optical path originating from the light emitting device; an optical filter interposed between the light emitting device and the optical fiber and configured to separate the first optical path originating from the light emitting device from a second optical path originating from the optical fiber; and a light receiving device placed on the second optical path.

Advantageous Effects of Disclosure

According to the present disclosure, the optical connector has a platform (Optical Sub Assembly (OSA)) formed as one integral structure and thus has advantages in terms of structural simplification and miniaturization. For example, by installing the light emitting device and the optical fiber on the OSA substrate, the light emitting device, the optical fiber, and the optical components therebetween may be automatically aligned on the basis of the single OSA substrate. Also, according to the present disclosure, the light emitting device, the optical fiber, the light receiving device, and the detection device may be automatically aligned through a guide wall formed on the single OSA substrate.

BRIEF DESCRIPTION OF DRAWINGS

FIGS. 1 and 2 show an optical connector according to an embodiment of the present disclosure.

FIG. 3 shows a diagram illustrating a structure of a reflective plate applicable to the present disclosure.

FIG. 4 shows a diagram illustrating alignment of optical components of the optical connector shown in FIG. 1.

FIGS. 5A to 5E schematically show a process of manufacturing the optical connector shown in FIG. 1.

FIG. 6 shows an OSA substrate applicable to another embodiment of the present disclosure.

FIG. 7 shows an optical connector according to another embodiment of the present disclosure.

BEST MODE

An optical connector according to an embodiment of the present disclosure includes an OSA substrate having a base surface and first and second support surfaces formed at a first level from the base surface and separated from each other, the OSA substrate being formed integrally therewith; a light emitting device supported by the first support surface; an optical fiber supported by the second support surface on a first optical path originating from the light emitting device; an optical filter interposed between the light emitting device and the optical fiber and configured to separate the first optical path originating from the light emitting device from a second optical path originating from the optical fiber; and a light receiving device placed on the second optical path.

For example, first and second polymer layers may be formed on the first and second support surfaces, respectively, and the first and second polymer layers may be formed to have different thicknesses in order to align the light emitting device and the optical fiber with each other.

For example, the second polymer layer may be formed thicker than the first polymer layer.

For example, the first and second polymer layers may be formed of the same material.

For example, the light receiving device may be placed on the base substrate.

For example, first and second guide walls may be formed on the first and second support surfaces to automatically align the light emitting device and an end portion of the optical fiber, respectively.

For example, the first and second guide walls may be formed integrally with the OSA substrate.

For example, the first and second guide walls may be formed on first and second polymer layers formed on the first and second support surfaces, and the first and second guide walls may be formed of a polymer material, which is different from materials of the first and second polymer layers.

For example, a third guide wall may be formed on the base surface to automatically align the light receiving device.

For example, the light emitting device and the optical fiber may be placed at opposite sides of the optical filter on the first optical path, along which light is transmitted through the optical filter, and the optical fiber and the light receiving device may be placed at the same side of the optical filter on the second optical path, along which light is reflected by the optical filter.

For example, the optical fiber and the light receiving device may be placed below the optical filter and separated from each other at different levels.

For example, a second polymer layer may be formed on the second support surface to support the optical fiber at a level higher than the first level.

For example, the optical filter may be obliquely placed to lean against the optical fiber and the light receiving device.

For example, the optical filter may have a first support point supported by an end portion of the optical fiber and a second support point supported on the base surface.

For example, the optical connector may further include a detection device placed on a third optical path originating from the light emitting device and a reflective plate placed between the light emitting device and the detection device.

For example, the detection device may be placed on the base surface together with the light receiving device.

For example, a fourth guide wall may be formed on the base surface to automatically align the detection device.

For example, the light emitting device and the detection device may be placed below the reflective plate and separated from each other at different levels.

For example, a first polymer layer may be formed on the first support surface to support the light emitting device at a level higher than the first level.

For example, the reflective plate may be obliquely placed to lean against the light emitting device and the detection device.

For example, a fixing protrusion block may be formed on the OSA substrate to fix an end portion of the reflective plate.

For example, the fixing protrusion block may have a top surface formed at the first level.

For example, the reflective plate may have a first support point supported by the light emitting device, a second support point supported on the base surface, and a third support point supported by the fixing protrusion block.

For example, the OSA substrate may include first and second sides for connecting the base surface with the first and second support surfaces, and the second side may form an overhang structure having a steep slope toward the base surface.

For example, the optical connector may further include a detection device placed on a third optical path originating from the light emitting device; and a reflective plate placed between the light emitting device and the detection device, wherein third and fourth guide walls may be formed integrally with the OSA substrate to automatically align the light receiving device and the detection device.

MODE OF DISCLOSURE

Hereinafter, an optical connector according to an embodiment of the present disclosure will be described with reference to the accompanying drawings.

FIGS. 1 and 2 show an optical connector according to an embodiment of the present disclosure. The optical connector may support bidirectionality in which optical signals with first and second wavelength ranges $\lambda 1$ and $\lambda 2$, which are different from each other, may be transmitted and received through one optical fiber 150. For example, the optical connector may function as a transmission end of the optical signal with the first wavelength range $\lambda 1$ and also function as a reception end of the optical signal with the second wavelength range $\lambda 2$, which is different from the first wavelength range $\lambda 1$. As described below, the optical signals with the first and second wavelength ranges $\lambda 1$ and $\lambda 2$, which are different from each other, may travel along first and second optical paths L1 and L2, which are spatially separated from each other, through an optical filter 130.

Referring to the drawings, the optical connector may include a light emitting device 110 that emits light along first and third optical paths L1 and L3 and a lens block 120, the optical filter 130, and the optical fiber 150 that are placed on the first optical path L1 and also include a reflective plate 160 that are placed on the third optical path L3 and a detection device 180 that detects an output of the light emitting device 110. Also, the optical connector may include a light receiving device 140 placed on the second optical path L2 that goes via the optical fiber 150 and the optical filter 130 and configured to receive light and convert the light into an electric signal.

The optical connector may further include an OSA substrate 100 configured to provide installation positions of optical components and automatically align the optical components. The OSA substrate 100 may be integrally formed, and thus the optical components may be automatically aligned (self-alignment) by accurately installing the optical components at the positions on the single OSA substrate 100. The OSA substrate 100 may include a base surface S0 and first and second support surfaces S1 and S2 that are formed at a first level h1 from the base surface S0 and separated from each other. In this case, the light emitting device 110 may be placed on the first support surface S1, and the optical fiber 150 may be placed on the second support surface S2. The optical filter 130 may be placed on the first optical path L1 for connecting the light emitting device 110 and the optical fiber 150 to spatially separate the first optical path L1 originating from the light emitting device 110 from the second optical path L2 originating from the optical fiber 150.

The light emitting device 110 may be a laser diode that operates in the first wavelength range $\lambda 1$. For example, the light emitting device 110 may be an edge emitting laser diode or a vertical cavity surface emitting laser diode (VCSEL).

The light emitting device 110 may have first and second light emitting surfaces 110a and 110b, which are opposite to each other. Light may be emitted from the first light emitting surface 110a to the optical fiber 150 via the lens block 120 and the optical filter 130 along the first optical path L1. That is, the lens block 120, the optical filter 130, and the optical fiber 150 may be placed on the first optical path L1 of the light emitting device 110.

The lens block 120 may focus the light provided by the light emitting device 110 and provide the focused light to the optical fiber 150. One surface of the lens block 120 may be spherical or aspherical, and the other surface may be planar.

The optical filter 130 may include dielectric thin films that are multi-layered on a glass substrate or a plastic substrate. The optical filter 130 may be a high-pass or low-pass edge filter. For example, the optical filter 130 may transmit light of the first wavelength range $\lambda 1$ and reflect light of the second wavelength range $\lambda 2$. Also, the optical filter 130 is not limited to the above example and may be modified in various structures. The optical filter 130 may be formed as any reflective/transmissive film capable of selectively performing reflection or transmission to separate optical signals with different wavelength ranges from each other. Also, the optical filter 130 is not limited to its name or shape and may be called another name such as a beam splitter or dichroic mirror.

However, the optical filter 130 is configured to spatially separate the first and second optical paths L1 and L2 originating from the light emitting device 110 and the optical fiber 150, which are different light sources, from each other and may be distinct from a device configured to divide light originating from the same light source according to different wavelength ranges or polarization components. Here, the optical filter 130 spatially separating the first optical path L1 originating from the light emitting device 110 from the second optical path L2 originating from the optical fiber 150 means that the first optical path L1 for connecting the light emitting device 110 and the optical fiber 150 and the second optical path L2 for connecting the optical fiber 150 and the light receiving device 140 are spatially separated to be different paths and does not mean that light originating from the same light source is split to travel along different paths according to wavelength ranges or polarization components.

The optical filter 130 may be placed on the first optical path L1 to transmit light of the first wavelength range $\lambda 1$ that is incident from the light emitting device 110 and provide the light to the optical fiber 150 and may be placed on the second optical path L2 to reflect light of the second wavelength range $\lambda 2$ that is incident from the optical fiber 150 and provide the light to the light receiving device 140.

The light receiving device 140 may detect output light of the optical fiber 150 reflected by the optical filter 130 and output an optical signal as an electric signal. For example, the optical filter 130 may support two-way communication by separating the optical signals with the first and second wavelength ranges $\lambda 1$ and $\lambda 2$, which are different from each other, and providing the optical signals to the first and second optical paths L1 and L2, which are different from each other.

In a relationship with the optical filter 130, the light emitting device 110 and the optical fiber 150 may be placed at opposite sides on the first optical path L1 of the optical filter 130, along which light is transmitted through the optical filter 130, and the optical fiber 150 and the light receiving device 140 may be placed at the same side of the optical filter 130 on the second optical path L2, along which light is reflected by the optical filter 130. For example, both of the optical fiber 150 and the light receiving device 140 may be placed below the optical filter 130. The optical fiber 150 and the light receiving device 140 may be placed below the optical filter 130, but may be placed at different levels from the base surface S0 and thus separated from each other.

For example, the optical filter 130 may be placed to lean against the optical fiber 150 and the light receiving device 140. That is, the optical filter 130 may be obliquely inclined to lean against the light receiving device 140 and one end of the optical fiber 150. The optical fiber 150 and the light receiving device 140 may be placed close to each other below the optical filter 130 that is obliquely inclined.

In order to avoid physical interference between the optical fiber 150 and the light receiving device 140, the optical fiber 150 and the light receiving device 140 may be separately placed at different levels from the base surface S0. For example, the optical fiber 150 may be placed on a second support surface S2 formed at the first level h1 from the base surface S0, and the light receiving device 140 may be placed on the base surface S0. In this case, a second polymer layer 102 for supporting the optical fiber 150 at a level higher than the first level h1 may be placed above the second support surface S2.

Physical interference between the light receiving device 140 and an end portion of the optical fiber 150 may be avoided by placing the light receiving device 140 on the base surface S0, which is relatively low, and placing the end portion of the optical fiber 150 on the second support surface S2 (or the second polymer layer 102 on the second support surface S2), which is relatively high. According to another embodiment of the present disclosure, in order to secure sufficient separation between the light receiving device 140 supported on the base surface S0 and the end portion of the optical fiber 150 supported on the second support surface S2 (or the second polymer layer 102 thereon), a trench groove (not shown) at a lower level than the base surface S0 may be formed at the position of the light receiving device 140.

The optical filter 130 may have a total of three support points 130a, 130b, and 130c. In more detail, the optical filter 130 may have a first support point 130a that is in contact with an edge of the optical fiber 150, a second support point 130b that is in contact with the base surface S0, and a third support point 130c that is in contact with the lens block 120. In this case, in a relationship with the lens block 120, the third support point 130c may be formed at peripheral side of the lens block 120 beyond the first optical path L1 of the lens block 120.

According to another embodiment of the present disclosure, the optical filter 130 may have a total of four support points 130a, 130b, 130c, and 130d. In more detail, the optical filter 130 may have a first support point 130a that is in contact with an edge of the optical fiber 150, a second support point 130b that is in contact with the base surface S0, a third support point 130c that is in contact with the lens block 120, and a fourth support point 130d that is in contact with an edge of the light receiving device 140. The optical filter 130 may be supported by the four support points 130a, 130b, 130c, and 130d and may be obliquely inclined with respect to the OSA substrate 100 and stably supported.

The second polymer layer 102 may enable the light emitting device 110 and the optical fiber 150 to be aligned with each other on an optical axis of the first optical path L1. For this, the second polymer layer 102 placed at a side of the optical fiber 150 may be formed thicker than a first polymer layer 101 placed at a side of the light emitting device 110. For example, the first polymer layer 101 placed at a side of the light emitting device 110 and the second polymer layer 102 placed at a side of the optical fiber 150 may be formed at the same first level h1 (i.e., the first and second support surfaces S1 and S2) from the base surface S0. In this case, in order to align an optical entrance of the optical fiber 150 with an optical exit of the light emitting device 110, the first polymer layer 101 placed at a side of the light emitting device 110 and the second polymer layer 102 placed at a side of the optical fiber 150 may be formed with different thicknesses t1 and t2. For example, when an edge emitting laser diode is used as the light emitting device 110, the first and second polymer layers 101 and 102 with different thicknesses t1 and t2 may align an upper edge of the light emitting device 110 with a center of the optical fiber 150 such that light is emitted from the upper edge of the light emitting device 110 to the center of the optical fiber 150.

For example, when the light emitting device 110 has a thickness of 150 μm and the optical fiber 150 has a thickness of 125 μm, the thickness t2 of the second polymer layer 102 placed at a side of the optical fiber 150 may be 87.5 μm, and the thickness t1 of the first polymer layer 101 placed at a side of the light emitting device 110 may be 0 μm. That is, in order to align the upper edge of the light emitting device 110 with the center of the optical fiber 150, the thickness t2 of the second polymer layer 102 placed at a side of the optical fiber 150 may be greater than the thickness t1 of the first polymer layer 101 placed at a side of the light emitting device 110. Here, the thickness t1 of the first polymer layer 101 placed at a side of the light emitting device 110 may be 0 μm. This means that the first polymer layer 101 is not formed at a side of the light emitting device 110. However, as described below, the first polymer layer 101 may be formed at a side of the light emitting device 110 in order to avoid interference with the detection device 180.

First and second guide walls g1 and g2 for self-alignment of the light emitting device 110 and the optical fiber 150 may be formed above the first and second polymer layers 101 and 102, respectively. In this case, the first and second polymer layers 101 and 102 may be formed of the same material and may be formed of a polymer material that is different from a guide polymer material used to form the first and second guide walls g1 and g2. The first and second polymer layers 101 and 102 may serve as an etching stopper for forming the first and second guide walls g1 and g2.

The optical fiber 150 may support two-way communication by transmitting optical signals with the first and second wavelength ranges λ1 and λ2, which are different from each other, through the single optical fiber 150. For example, according to an embodiment of the present disclosure, the end portion of the optical fiber 150 may function as a transmission end of the optical signal with the first wavelength range λ1 and also function as a reception end of the optical signal with the second wavelength range λ2. Although not shown, the optical fiber 150 may include a core through which light is traveling and a cladding layer that surrounds the core.

The light emitting device 110 may have the first and second light emitting surfaces 110a and 110b, which are opposite to each other. Light may be emitted from the second light emitting surface 110b to the reflective plate 160 along the third optical path L3 and then reflected to the detection device 180. The reflective plate 160 may enable the optical exit of the light emitting device 110 and the optical entrance of the detection device 180 to be placed on the third optical path L3.

The light emitting device 110 and the detection device 180 may be placed at the same side of the reflective plate 160 on the third optical path L3, along which light is reflected by the reflective plate 160. For example, the light emitting device 110 and the detection device 180 may be placed below the reflective plate 160, but may be displaced at different levels from the base surface S0 and thus separated from each other.

The reflective plate 160 may be placed to lean against the light emitting device 110 and the detection device 180. That is, the reflective plate 160 may be obliquely inclined to lean against the light emitting device 110 and the detection device 180. The light emitting device 110 and the detection device 180 may be placed close to each other below the reflective plate 160 that is obliquely inclined.

In order to avoid physical interference between the light emitting device 110 and the detection device 180, the light emitting device 110 and the detection device 180 may be separately placed at different levels from the base surface S0. For example, the light emitting device 110 may be formed on the first support surface S1 formed at the first level h1 from the base surface S0, and the detection device 180 may be formed on the base surface S0. In this case, a first polymer layer 101 may be formed on the first support surface S1 to support the light emitting device 110 at a level higher than the first level h1.

Physical interference between the detection device 180 and the light emitting device 110 may be avoided by placing the detection device 180 on the base surface S0 that is relatively low and placing the light emitting device 110 on the first support surface S1 (or the first polymer layer 101 on the first support surface S1) that is relatively high. According to another embodiment of the present disclosure, when the detection device 180 is formed to a sufficiently small thickness, the first polymer layer 101 may be omitted. Also, according to another embodiment of the present disclosure, in order to secure sufficient separation between the detection device 180 supported on the base surface S0 and the light emitting device 110 supported on the first support surface S1 (or the first polymer layer 101 thereon), a trench groove (not shown) at a lower level than the base surface S0 may be formed at the position of the detection device 180.

For the support of the reflective plate 160, one side of the reflective plate 160 may be supported by leaning against an edge of the light emitting device 110, and the other side of the reflective plate 160 may be supported by a fixing protrusion block B. In more detail, the fixing protrusion block B for fixing an end portion of the reflective plate 160 may be formed on the OSA substrate 100. In this case, the fixing protrusion block B may have a top surface formed at the first level h1.

The fixing protrusion block B may have the top surface formed at the same level as the first and second support surfaces S1 and S2. By using such a structure, the OSA substrate 100 may have surfaces with two different levels, that is, the base surface S0 and the surfaces S1, S2, and B with the first level h1 through one-time etching. By forming the OSA substrate 100 through one-time etching in this way, it is possible to simplify a manufacturing process thereof.

The reflective plate 160 may have a total of three support points 160a, 160b, and 160c. In more detail, the reflective plate 160 may have a first support point 160a that is in contact with an edge of the light emitting device 110, a second support point 160b that is in contact with the base surface S0 of the OSA substrate 100, and a third support point 160c that is in contact with the fixing protrusion block B.

According to another embodiment of the present disclosure, the reflective plate 160 may have a total of four support points 160a, 160b, 160c, and 160d. In more detail, the reflective plate 160 may have a first support point 160a that is in contact with an edge of the light emitting device 110 and a second support point 160b that is in contact with the base surface S0 of the OSA substrate 100. Also, the reflective plate 160 may have a third support point 160c that is in contact with the fixing protrusion block B and a fourth support point 160d that is in contact with an edge of the detection device 180.

FIG. 3 shows a diagram illustrating a structure of a reflective plate applicable to the present disclosure.

Referring to the drawing, the reflective plate 160 may include a reflective layer 165 coated over a transparent plate 161. In this case, the reflective layer 165 may be formed on a rear surface opposite to a front surface of the transparent plate 161 that is in contact with the light emitting device 110. In the reflective layer 165 formed at the rear surface of the transparent plate 161, an installation position of the detection device 180 may be secured at a place d that is sufficiently spaced apart from the light emitting device 110 by moving a position of reflected light backward in a direction away from the light emitting device 110. By moving the position of the reflected light backward, the installation position of the detection device 180 may be secured such that the optical exit of the light emitting device 110 and the optical entrance of the detection device 180 are aligned on an optical axis. When the installation position of the detection device 180 is not sufficiently secured, the optical exit of the light emitting device 110 and the optical entrance of the detection device 180 are misaligned from each other. In this case, an optical loss occurs, and thus the amount of light cannot be accurately captured.

The reflective layer 165 formed at the rear surface of the transparent plate 161 may vary in position depending on the thickness of the transparent plate 161, and thus the position of the reflected light may move forward or backward depending on the thickness of the transparent plate 161. For example, the reflective layer 165 may be formed as a metal layer with high reflectivity and may be formed to include Au, Ag, Mg, Al, Pt, Pd, Ni, Nd, Ir, Cr, Li, Yb, or Ca.

The detection device 180 is for capturing the amount of light of the light emitting device 110, and a driving voltage of the light emitting device 110 may be controlled on the basis of the amount of light captured by the detection device 180 and an amount of current injected into the light emitting device 110 and an amount of light may be maintained at a certain level by controlling the driving voltage of the light emitting device 110.

The OSA substrate 100 may be formed as a silicon substrate and may be integrally formed. The OSA substrate 100 may include the base surface S0 and the first and second support surfaces S1 and S2 formed at the first level h1 from the base surface S0. Also, the OSA substrate 100 may include a groove 100' for insertion of the lens block 120.

The light receiving device 140 and the detection device 180 may be placed on the base surface S0. The base surface S0 may include a base surface S0 on which the light receiving device 140 is placed and a base surface S0 on which the detection device 180 is placed. The base surface S0 may support the light receiving device 140 and the detection device 180 for capturing light reflected by the optical filter 130 and the reflective plate 160 at a height that is relatively low according to a position of the reflected light.

The first and second support surfaces S1 and S2 may be formed at the first level h1 from the base surface S0, for example, may be formed at a height of 137.5 μm. The first support surface S1 may support the light emitting device 110, and the second support surface S2 may support the optical fiber 150. The light emitting device 110 and the optical fiber 150 may be placed on the first and second support surfaces S1 and S2 that are relatively high. Thus, the light may be reflected by the reflective plate 160 and the optical filter 130, which are obliquely inclined, to the detection device 180 and the light receiving device 140, which are placed on the base surface S0 that is relatively low.

The fixing protrusion block B may have the top surface formed at the first level h1 from the base surface S0. That is, the fixing protrusion block B may have the top surface formed at the same level as the first and second support surfaces S1 and S2.

By using such a structure, the OSA substrate 100 may have surfaces with two different levels, that is, the base surface S0 and the surfaces S1, S2, and B with the first level h1 through one-time etching. In this way, it is possible to simplify a manufacturing process by enabling the OSA substrate 100 to be formed through one-time etching. Additionally, when an etching for forming a groove 100' for insertion of the lens block 120 is included, the OSA substrate 100 that forms a platform of an optical connector (Optical Sub Assembly (OSA)) may be formed through a total of two etchings.

As described above, the first and second polymer layers 101 and 102 may be formed to have different thicknesses t1 and t2 on the first support surface S1 placed at a side of the light emitting device 110 and on the second support surface S2 placed at a side of the optical fiber 150, respectively. The first and second polymer layers 101 and 102 may be formed to have the different thicknesses t1 and t2 to align optical axes of the light emitting device 110 and the optical fiber 150. For example, the first and second polymer layers 101 and 102 with the different thicknesses t1 and t2 may align an upper edge of the light emitting device 110 with a center of the optical fiber 150 such that light is emitted from the upper edge of the light emitting device 110 to the center of the optical fiber 150. Also, the first and second polymer layers 101 and 102 may avoid physical interference between the light emitting device 110 and the detection device 180 or physical interference between the optical fiber 150 and the light receiving device 140.

FIG. 4 shows a diagram illustrating alignment of optical components of the optical connector shown in FIG. 1.

The alignment of the light emitting device 110, the detection device 180, an end portion of the optical fiber 150, and the light receiving device 140 that are placed on the OSA substrate 100 will be described below with reference to FIG. 4.

The light emitting device 110 and the end portion of the optical fiber 150 may be aligned on a straight line on the first optical path L1 of the light emitting device 110. Also, the end portion of the optical fiber 150 and the light receiving device 140 may be aligned on a straight line on the second optical path L2 from the optical fiber 150. Also, the light emitting device 110 and the detection device 180 may be aligned on a straight line on the third optical path L3 of the light emitting device 110. According to an embodiment of the present disclosure, the light emitting device 110, the detection device 180, the end portion of the optical fiber 150, and the light receiving device 140 may be automatically aligned through self-alignment.

The light emitting device 110 may be aligned at an accurate position by a first guide wall g1. For example, the light emitting device 110 may be assembled at an accurate position that is defined between a pair of first guide walls g1 formed on the first support surface S1 or on the first polymer layer 101 thereabove.

The end portion of the optical fiber 150 may be aligned at an accurate position by a second guide wall g2. For example, the end portion of the optical fiber 150 may be assembled at an accurate position that is defined between a pair of second guide walls g2 formed on the second support surface S2 or on the second polymer layer 102 thereabove.

The light receiving device 140 may be aligned at an accurate position by a third guide wall g3. For example, the light receiving device 140 may be assembled at an accurate position that is defined between a pair of third guide walls g3 formed on the base surface S0.

The detection device 180 may be aligned at an accurate position by a fourth guide wall g4. For example, the detection device 180 may be assembled at an accurate position that is defined between a pair of fourth guide walls g4 formed on the base surface S0.

As shown in the drawing, the guide walls g1, g2, g3, and g4 may include a pair of first guide walls g1 for alignment of the light emitting device 110, a pair of second guide walls g2 for alignment of the end portion of the optical fiber 150, a pair of third guide walls g3 for alignment of the light receiving device 140, and a pair of fourth guide walls g4 for alignment of the detection device 180. In this case, center lines of the first to fourth guide walls g1, g2, g3, and g4 may be aligned on one straight line. That is, the central line C between the pair of first guide walls g1, the center line C between the pair of second guide walls g2, the center line C between the pair of third guide walls g3, and the center line C between the pair of fourth guide walls g4 may be aligned on one straight line. Thus, optical components assembled between the first to fourth guide walls g1, g2, g3, and g4 may be aligned on optical axes of the first to third optical paths L1, L2, and L3.

The guide walls g1, g2, g3, and g4 may be formed to have a height enough to fix optical components to be aligned. For example, the guide walls g1, g2, g3, and g4 may be formed to have a height of 40 µm or greater.

The guide walls g1, g2, g3, and g4 may be formed through an etching process. For example, a pattern of the guide walls g1, g2, g3, and g4 may be formed by applying a guide polymer layer on the OSA substrate 100, applying a photolithography process, and etching a portion exposed from a mask with a predetermined pattern. In this case, the guide polymer layer may be formed of a material different from those of the first and second polymer layers 101 and 102 and may be patterned using an etchant with a selective etching property for the guide polymer layer.

According to another embodiment of the present disclosure, the guide walls g1, g2, g3, and g4 may be integrally formed on the OSA substrate 100. That is, some or all of the first to fourth guide walls g1, g2, g3, and g4 may be formed by etching the OSA substrate 100 and may be formed not by patterning a separate guide polymer layer but by etching the OSA substrate 100 itself. For example, the first and second guide walls g1 and g2 may be integrally formed on the first and second support surfaces S1 and S2 of the OSA substrate 100. Also, the third and fourth guide walls g3 and g4 may be integrally formed on base surface S0 of the OSA substrate 100. It is possible to omit a process of stacking or patterning the guide polymer layer by integrally forming the guide walls g1, g2, g3, and g4 on the OSA substrate 100.

When the first and second guide walls g1 and g2 are formed on the first and second polymer layers 101 and 102 respectively, the first and second guide walls g1 and g2 may be formed by patterning the guide polymer layer, and the third and fourth guide walls g3 and g4 may be integrally formed on the base surface S0 of the OSA substrate 100 together with the OSA substrate 100.

FIGS. 5A to 5E schematically show a process of manufacturing the optical connector shown in FIG. 1. The formation of the optical connector will be described below with reference to the drawings.

Referring to FIG. 5A, the base surface S0 may be formed by preparing a silicon substrate and etching remaining parts other than the surfaces S1, S2, and B with the first level h1 through first etching of the silicon substrate. That is, the first and second support surfaces S1 and S2 for supporting the light emitting device 110 and the end portion of the optical fiber 150 and the fixing protrusion block B are formed through the first etching. Then, a groove 100' for insertion of the lens block 120 is formed through second etching of the silicon substrate. In this way, OSA substrate 100 may be formed by forming an installation position of the light emitting device 110, an installation position of the end portion of the optical fiber 150, and the fixing protrusion block B and forming the groove 100' for insertion of the lens block 120, through the first and second etching of the silicon substrate.

Next, as shown in FIG. 5B, the first and second polymer layers 101 and 102 are formed on the first and second support surfaces S1 and S2 of the OSA substrate 100. The first and second polymer layers 101 and 102 may be formed at the installation position of the light emitting device 110 and the installation position of the end portion of the optical fiber 150 and may be formed to have different thicknesses t1 and t2 in order to align the optical exit of the light emitting device 110 and the optical entrance of the optical fiber 150. In this case, the thicknesses t1 and t2 of the first and second polymer layers 101 and 102 may be appropriately determined in consideration of interference between the light emitting device 110 and the detection device 180 and interference between the end portion of the optical fiber 150 and the light receiving device 140.

Next, a guide polymer layer is formed at the installation position of the light emitting device 110, the installation position of the end portion of the optical fiber 150, and the installation position of the light receiving device 140, and the installation position of the detection device 180 on the OSA substrate 100. Then, guide walls g1, g2, g3, and g4 for placing optical components at accurate positions are formed through patterning such as photolithography. That is, the guide walls g1, g2, g3, and g4 may include guide wall pairs g1, g2, g3, or g4 with interposing the optical components therebetween. In more detail, the first guide wall g1 for alignment of the light emitting device 110, the second guide wall g2 for alignment of the end portion of the optical fiber 150, the third guide wall g3 for alignment of the light receiving device 140, and the fourth guide wall g4 for alignment of the detection device 180 may be collectively formed. For example, the guide walls g1, g2, g3, and g4 may be formed by forming a guide polymer layer to a certain thickness at corresponding positions and removing remaining parts other than the guide walls g1, g2, g3, and g4 through patterning. For example, the light emitting device 110, the end portion of the optical fiber 150, the light receiving device 140, and the detection device 180 may be optically aligned on a straight line by forming the first to fourth guide walls g1, g2, g3, and g4 such that center lines C of the first to fourth guide walls g1, g2, g3, g4 are placed on a straight line.

Next, as shown in FIG. 5C, corresponding optical components are installed between the guide walls g1, g2, g3, and g4. That is, the light receiving device 140 and the detection device 180 are installed between a pair of third guide wall g3 and fourth guide wall g4. Then, the light emitting device 110 is installed between a pair of first guide walls g1, and the lens block 120 is inserted into the groove 100' formed adjacent to the light emitting device 110. Next, the end portion of the optical fiber 150 is installed between a pair of second guide walls g2. In this way, a plurality of optical components are guided to accurate positions by the guide walls g1, g2, g3, and g4 formed on one OSA substrate 100. Thus, the alignment of the optical components may be automatically achieved through self-alignment.

Next, as shown in FIG. 5D, the reflective plate 160 is installed to lean against the light emitting device 110 and the fixing protrusion block B. For example, the reflective plate 160 may be obliquely inclined with respect to the OSA substrate 100. For example, the reflective plate 160 may be placed in a space defined by the light emitting device 110 and the fixing protrusion block B.

Next, as shown in FIG. 5E, the optical filter 130 may be installed to lean against the end portion of the optical fiber 150 and the base surface S0. For example, the optical filter 130 may be obliquely inclined with respect to the OSA substrate 100. For example, the optical filter 130 may be placed in a space defined by the end portion of the optical fiber 150, the light receiving device 140, and the lens block 120.

According to the present disclosure, the OSA substrate 100 that forms the platform (Optical Sub Assembly (OSA)) of the optical connector is formed as one integral structure. Accordingly, it is possible to simplify the structure, and also it is easy to perform miniaturization. For example, since both of the light emitting device 110 and the optical fiber 150 are installed on the OSA substrate 100, the alignment of the light emitting device 110, the optical fiber 150, and other optical components therebetween may be automatically achieved on the basis of the single OSA substrate 100. For example, the light emitting device 110, the optical fiber 150, the light receiving device 140, and the detection device 180 may be automatically aligned through the guide walls g1, g2, g3, and g4 formed on the single OSA substrate 100.

FIG. 6 shows an OSA substrate 100' applicable to another embodiment of the present disclosure.

Referring to the drawing, the OSA substrate 100 may include first and second sides A1 and A2 that connect a base surface S0 with first and second support surfaces S1 and S2, and the second side A2 may include an overhang structure having a steep slope toward the base surface S0. The overhang structure may sufficiently secure an installation position of a light receiving device 140 and may facilitate optical alignment with an optical fiber 150 on a second optical path L2. For example, when the second side A2 is formed as a vertical surface, it may be difficult to secure the installation position of the light receiving device 140 placed beside the second side A2 because of a rounded undercut that may be formed on the second side A2. The overhang structure may prevent an undercut that may appear during etching and may sufficiently secure the installation position of the light receiving device 140 despite the undercut.

A tip part of the second side A2 may be formed to protrude below a second polymer layer 102. Since the tip part of the second side A2 is relatively protruding, a second polymer layer 102 and an end portion of the optical fiber 150, which are formed thereon, may be sufficiently supported.

The overhang structure may be formed by anisotropically etching a silicon substrate. For example, a second side A2 inclined toward the base surface S0 may be formed by using a silicon substrate in a direction (111), for example, single crystal silicon with (111) crystal orientation, and performing anisotropic etching. Since a surface (111) is more condensed than a surface (100), an anisotropic etching speed is slower in the surface (111) than in the surface (100). Such an anisotropic etching may be performed as wet etching. For example, an anisotropic etching solution may be made by mixing KOH with water and isopropyl alcohol.

As shown in FIG. 6, the overhang structure may be formed on the first side A1 adjacent to the detection device 180 as well as the second side A2 adjacent to the light receiving device 140, and may sufficiently secure an installation position of the detection device 180 despite an undercut.

FIG. 7 shows an optical connector according to another embodiment of the present disclosure. Referring to the drawing, a first fixing protrusion block B1 for fixing the reflective plate 160 and a second fixing protrusion block B2 for fixing an end portion of the optical filter 130 may be formed on the OSA substrate 100. For example, top surfaces of the first and second fixing protrusion blocks B1 and B2 may be formed at the same level and may be formed at the same first level h1 as the first and second support surfaces S1 and S2. By using such a structure, the OSA substrate 100 may have surfaces with two different levels, that is, the base surface S0 and the surfaces S1, S2, B1, and B2 with the first level h1 through one-time etching. By forming the OSA substrate 100 through one-time etching in this way, it is possible to simplify a manufacturing process thereof.

The optical filter 130 may have a total of three support points 130a, 130b, and 130c. For example, the optical filter 130 may have a first support point 130a that is in contact with an edge of the optical fiber 150, a second support point 130b that is in contact with the base surface S0, and a third support point 130c that is in contact with the second fixing protrusion block B2. In this case, by supporting the optical filter 130 by the second fixing protrusion block B2 that is separate from the lens block 120, it is possible to independently support the lens block 120 and the optical filter 130 and avoid unnecessary interference.

While the present invention has been described with reference to an embodiment shown in the accompanying drawings, it should be understood by those skilled in the art that this embodiment is merely illustrative of the invention and that various modifications and equivalents may be made without departing from the spirit and scope of the invention. Accordingly, the technical scope of the present invention should be determined only by the appended claims.

INDUSTRIAL APPLICABILITY

The present disclosure is applicable to optical communication and its application fields.

The invention claimed is:

1. An optical connector comprising:
   an OSA substrate having a flat base surface and flat first and second support surfaces formed at a first level from the flat base surface and separated from each other, the OSA substrate being formed integrally therewith;
   a light emitting device supported by the flat first support surface;
   an optical fiber supported by the flat second support surface on a first optical path originating from the light emitting device;
   an optical filter on a flat bottom surface of a groove lower than the flat base surface, interposed between the light emitting device and the optical fiber and configured to separate the first optical path originating from the light emitting device from a second optical path originating from the optical fiber; and
   a light receiving device placed on the second optical path, an end of the optical fiber and the light receiving device placed below the optical filter in their entirety and separated from each other at different levels,
   a detection device placed on a third optical path originating from the light emitting device, a reflective plate placed between the light emitting device and the detection device, an end of the light emitting device and the detection device placed below the reflective plate in their entirety and separated from each other at different levels, wherein the detection device and light receiving device are placed on the flat base surface.

2. The optical connector of claim 1, wherein first and second polymer layers are formed on the flat first and second support surfaces, respectively, and the first and second polymer layers are formed to have different thicknesses in order to align the light emitting device and the optical fiber with each other.

3. The optical connector of claim 2, wherein the second polymer layer is formed thicker than the first polymer layer.

4. The optical connector of claim 2, wherein the first and second polymer layers are formed of a same material.

5. The optical connector claim 1, wherein first and second guide walls are formed on the flat first and second support surfaces to automatically align the light emitting device and an end portion of the optical fiber, respectively.

6. The optical connector of claim 5, wherein the first and second guide walls are formed integrally with the OSA substrate.

7. The optical connector of claim 5, wherein:
   the first and second guide walls are formed on first and second polymer layers formed on the flat first and second support surfaces; and the first and second guide walls are formed of a polymer material, which is different from materials of the first and second polymer layers.

8. The optical connector of claim 5, wherein a third guide wall is formed on the flat base surface to automatically align the light receiving device.

9. The optical connector of claim 1, wherein:
the light emitting device and the optical fiber are placed at opposite sides of the optical filter on the first optical path, along which light is transmitted through the optical filter; and
the optical fiber and the light receiving device are placed at a same side of the optical filter on the second optical path, along which light is reflected by the optical filter.

10. The optical connector of claim 1, wherein a second polymer layer is formed on the flat second support surface to support the optical fiber at a level higher than the first level.

11. The optical connector of claim 1, wherein the optical filter is obliquely placed to lean against the optical fiber and the light receiving device.

12. The optical connector of claim 11, wherein the optical filter has a first support point supported by an end portion of the optical fiber and a second support point supported on the flat base surface.

13. The optical connector of claim 1, wherein a fourth guide wall is formed on the flat base surface to automatically align the detection device.

14. The optical connector of claim 1, wherein a first polymer layer is formed on the flat first support surface to support the light emitting device at a level higher than the first level.

15. The optical connector of claim 14, wherein the reflective plate is obliquely placed to lean against the light emitting device and the detection device.

16. The optical connector of claim 15, wherein a fixing protrusion block is formed on the OSA substrate to fix an end portion of the reflective plate.

17. The optical connector of claim 16, wherein the fixing protrusion block has a top surface formed at the first level.

18. The optical connector of claim 16, wherein the reflective plate has a first support point supported by the light emitting device, a second support point supported on the flat base surface, and a third support point supported by the fixing protrusion block.

19. The optical connector of claim 1, wherein:
the OSA substrate includes first and second sides for connecting the flat base surface with the flat first and second support surfaces; and
the second side forms an overhang structure having a steep slope toward the flat base surface.

20. The optical connector of claim 1, further comprising:
third and fourth guide walls formed integrally with the OSA substrate to automatically align the light receiving device and the detection device.

* * * * *